Sept. 22, 1942.  R. STUART  2,296,655
PHOTOGRAPHIC SYSTEM AND APPARATUS
Filed April 25, 1941   3 Sheets-Sheet 1
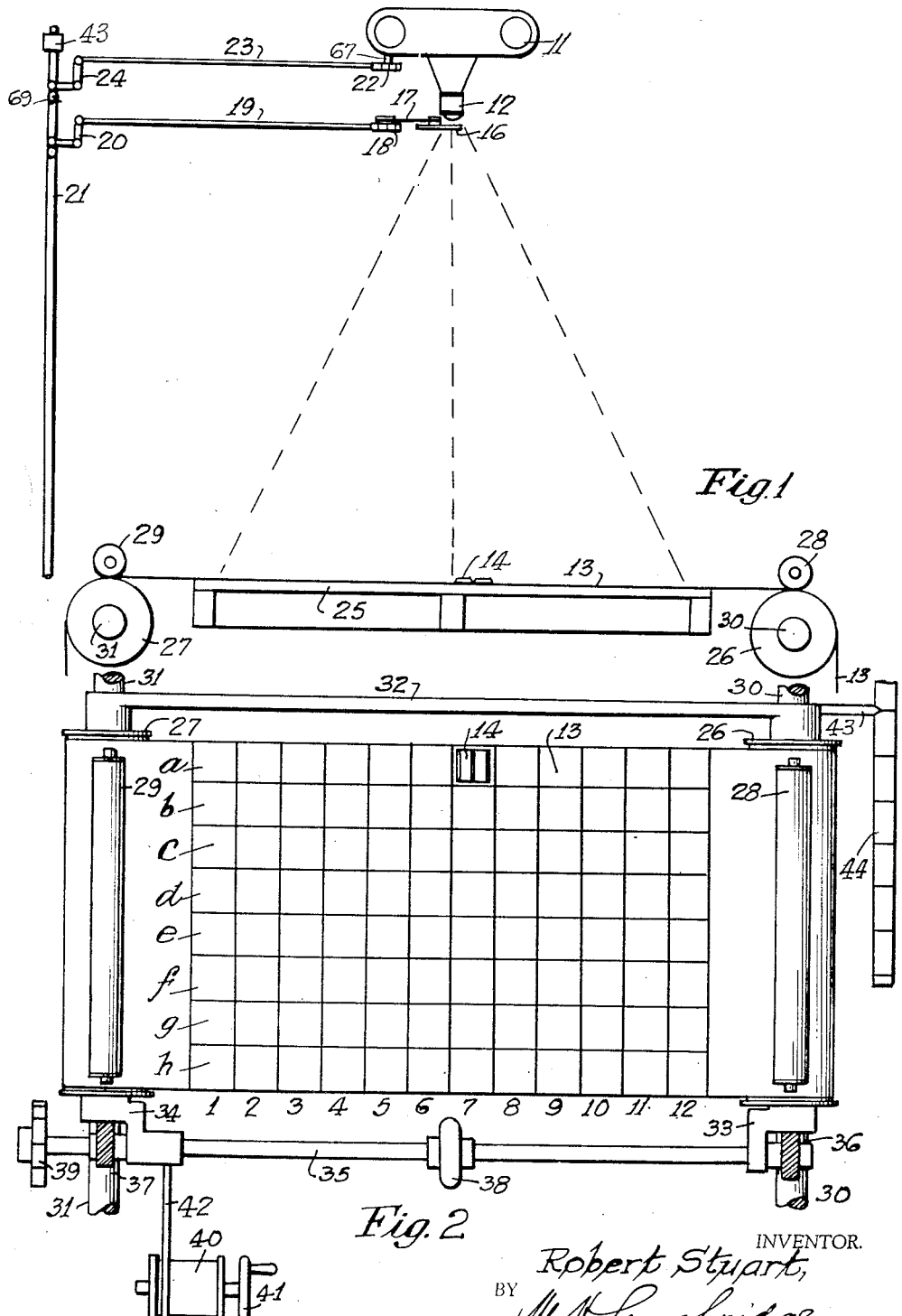

Sept. 22, 1942.   R. STUART   2,296,655
PHOTOGRAPHIC SYSTEM AND APPARATUS
Filed April 25, 1941   3 Sheets-Sheet 2
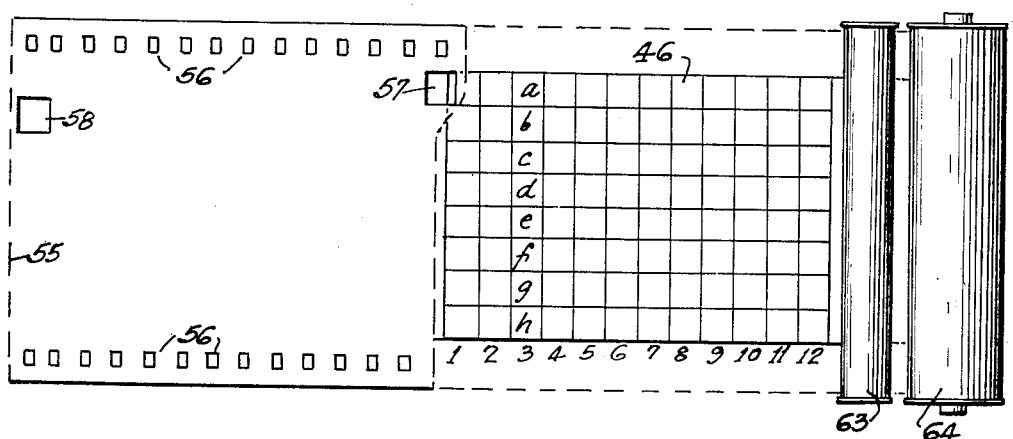
Fig. 3
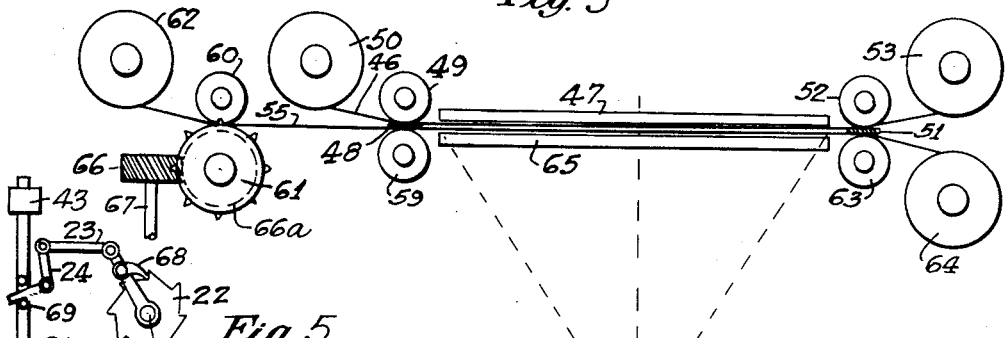
Fig. 5
Fig. 4
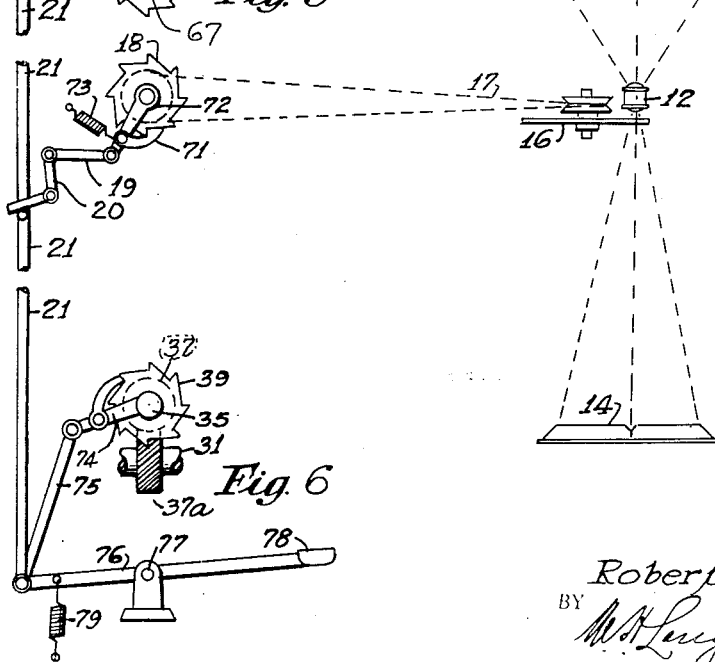
Fig. 6
INVENTOR.
Robert Stuart,
BY M. H. Loughridge
ATTORNEY.

Sept. 22, 1942.                R. STUART                    2,296,655
                    PHOTOGRAPHIC SYSTEM AND APPARATUS
                    Filed April 25, 1941          3 Sheets-Sheet 3

INVENTOR.
Robert Stuart,
BY
                ATTORNEY.

Patented Sept. 22, 1942

2,296,655

UNITED STATES PATENT OFFICE 2,296,655

PHOTOGRAPHIC SYSTEM AND APPARATUS

Robert Stuart, Forest Hills, Long Island, N. Y.

Application April 25, 1941, Serial No. 390,279

13 Claims. (Cl. 88—24)

This invention relates to photographic systems and the apparatus used therewith and it has for an object to provide means for photographing portions of an exposed sheet progressively; another object of the invention is to provide a photo-sensitive sheet in the field of a camera with a movable mask whereby only a portion of the sheet can be exposed at one time; another object of the invention is to provide a photo-sensitive sheet in the field of a camera with a mask for covering the sheet, having a window therein exposing a portion of the sheet and means for moving the object to be photographed to correspond with the position of the window in the mask; another object of the invention is to provide a system for making multi-photographs on a sheet by the use of a mask for exposing a portion of the sheet with means for progressively moving the mask and correspondingly moving the object to be photographed until the sheet has been used up, and another object of the invention is to provide a system for making multi-photographs on a sheet with a movable mask having a window covering the sheet and means for moving the object to be photographed in synchronism with the mask to correspond with the position of the window. A more particular object of the invention is to photograph the pages of a book progressively in multi-photographs on a film or sheet in the camera; other objects of the invention will be more particularly understood from the following specification and the accompanying drawings, in which:

Fig. 1 is a diagram showing the arrangement of the camera and the movable table supporting the object to be photographed;

Fig. 2 is a plan view of one form of table supporting the object to be photographed;

Fig. 3 is an elevation of the photographic film or sheet and the mask that is used to protect the sheet;

Fig. 4 is a diagram of the optical arrangement and the method of feeding the film and the mask;

Fig. 5 is a detail of the stepping mechanism used to move the mask after each exposure;

Fig. 6 is a foot-operated lever for operating the stepping mechanism that moves the table supporting the object and operates in synchronism therewith the movement of the mask and the shutter of the camera;

Figure 9:
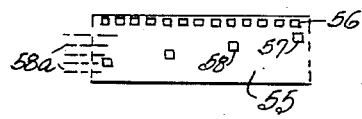
Fig. 9 is a plan view of one type of mask for photographing the subject in squares on the sheet.

The present invention relates to a system for making a plurality of different objects on a film or sheet exposed in the optical system of a camera and protected by a mask having an aperture or window which exposes only the portion of the film opposite the window. The film remains stationary in the camera while, after each exposure, the mask is moved to a new position to take the next picture on a fresh portion of the film. Co-operating with the movement of the mask the object is also moved so that it occupies a position in the optical field of the camera, corresponding to the portion of the film that is exposed through the mask. The invention is intended for micro-filming objects on a photographic sheet which may be reproduced and enlarged but it is not necessarily confined to micro-films.

The operation of the mechanism depends upon the shape of the window in the mask. For instance, if the photographs are to be made in squares and in rows, one following the other, then the mask is provided with a square window in line with the first row and a stepping mechanism moves it one space for each exposure, and after the first row is completed a second window is brought into register with the second row of exposures and is correspondingly stepped across the film until this row of exposures is completed and the following rows are exposed one at a time in the same manner.

The object to be photographed may be located on a table laid out in squares to correspond with the position of the windows for each exposure of the camera. The object is located on the first square for the first exposure, then it is moved to the second square for the next exposure in the same row and so on until the row is completed, after which the object is located on the first square of the second row and on each square progressively thereafter for each exposure of the camera and this is continued throughout the following rows until the squares are used up. The object to be photographed may be located by moving the table upon which it is supported according to an index member indicating the location of the table for each exposure. The system may further be operated automatically by a foot pedal which operates the mask, the camera shutter and the table carrying the object in synchronism.

It is apparent that if all the objects to be photographed could be located in proper order on the table, at the same time, a single exposure would photograph all these objects properly arranged on the film; however, if the object to be photographed cannot thus be arranged for a single exposure, as for instance, in photographing the pages of a book which remain bound in the book so that only one page or folio is in position to be photographed at a time, then the book is located on each square of the table as described and after each exposure a new page of the book is turned up so as to place the pages consecutively on the photographic sheet.

If the object to be photographed is placed in vertical rows on the table so that a complete row may be photographed in each exposure of the camera, the mask is then provided with vertical windows corresponding to the width of a vertical row on the table so that for each operation of the system a new row is brought into the photographic position on the table and the aperture of the mask is correspondingly adjusted to enable this row to be photographed.

If the objects to be photographed are placed in alternate rows on the table so that one-half of the table is covered with objects at one time, then the mask is provided with alternate slots which correspond with the alternate rows on the table and after a single exposure in this position, the mask is then moved one space so as to cover the portion of the film already exposed and to bring a portion corresponding to the other rows on the table into the photographic field. The objects now placed on the other rows can be photographed.

The electrical control of the mask and the camera shutter insures that the mask must complete its movement before the shutter can be operated. For large reductions the camera is usually placed some distance from the exposure table and is rigidly mounted to avoid vibration and under these conditions the electric control is sometimes preferred.

In the drawings, 11 is a camera of the usual film type having a lens 12 projecting upon the exposure table 13 where the object or book 14 is located. The camera is provided with a shutter 16, which through a belt 17 and ratchet wheel 18, operated by rod 19, crank 20 and vertical rod 21 is operated to make the exposure for each step of the mechanism. The mask on the inside of the camera through shaft 67, ratchet wheel 22, rod 23, crank 24 and pin 69, is operated one step by each vertical movement of the shaft 21.

The exposure table comprises the parallel rods 30 and 31 connected by the frame member 32 which supports the roller 26 on rod 30 and the roller 27 on rod 31. Between the rollers 26 and 27 the flexible cover 13 is moved being held taut by the weighted rollers 28 and 29 and being supported in the center by the under frame 25. The table 13 may be laid out in squares as indicated in Fig. 2.

It is apparent that the book 14 may be manually moved from square to square along the top row $a$ then it may be moved in a similar manner on the second row $b$ and then similarly in the following rows, indicated by $c$, $d$, $e$, $f$, $g$ and $h$. The vertical rows may also be indicated by the numerals 1 to 12. The frame 32 is provided with an index member 43 which registers with the fixed index bar 44, having graduations thereon, spaced according to the horizontal rows of squares so that the entire frame may be slid forward on the rods 30 and 31 to move the object from one row to the next row as indicated by the member 43. The exposure table may also be moved to bring the different vertical rows into the photographic position by rotating the rollers 36 and 37. This is secured by a shaft 35, mounted in the brackets 33 and 34 and having a worm wheel or a spiral gear 36 engaging a corresponding spiral on the shaft of roller 26 and a corresponding spiral gear 27 engaging gear 37a on shaft 31 of roller 27. The shaft 35 is provided with a ratchet wheel 39 whereby this shaft is moved one step for each operation. The shaft 35 is also manually operated by the wheel 38 and the frame 32 may be moved by the roller 40 and hand wheel 41, retrieving the band 42 to bring the frame to the desired position.

In Fig. 3 the film is indicated at 46 as it is located in the optical field of the camera and is shown laid out in squares with index marks corresponding to the squares of the exposure table in Fig. 3. These marks do not appear on the film, the squares are merely shown for convenience in comparing the location of the object on the exposure table with the corresponding location on the film. The film moves between the reels 50 and 53, Fig. 4, and is held taut between the roller 49 and the spacer 48 at one side and the roller 52 and the spacer 51 at the opposite side. The film is also supported on a level plane by the back plate 47. The mask 55 is mounted on rollers 62 and 64 and is held taut between roller 59 and spacer 48 at one side and roller 63 and spacer 51 at the opposite side and the front of the mask is maintained level by the glass or transparent plate 65. The mask is provided with sprocket holes 56 which are held in engagement with the sprocket roller 61 by the roller 60. Shaft 67 is provided with a spiral gear 66, engaging a corresponding gear 66a on roller 61 which rotates this roller and moves the mask in accordance with the movement of shaft 67. Shaft 67 is provided with a ratchet wheel 22 which, through the detent 68, is moved forward one step by each movement of rod 23 and rod 21. Ratchet wheel 18, which operates the shutter 16, is engaged by the detent 71, mounted on arm 72 and operated in one direction by the rod 19 and shaft 21. Spring 73 restores the arm 72 after rod 21 is restored and thereby operates the shutter to make the exposure. Lever 76, pivoted at 77 is provided with a foot pedal 78 and is retrieved by spring 79. The outer end of this lever connects to rod 21 to operate the mask and the shutter. Rod 75 also connects to the end of lever 76 and through arm 74 operates the ratchet wheel 39 which rotates the shaft 31 and thereby moves the exposure table.

In operation the object 14 may be placed on square $a1$ and the window 57, opposite the top row on the mask, is located to register with the square $a1$ and in this position an exposure is made. The pedal 78 is now depressed, which moves the mask 55 to locate the window 57 opposite the second vertical row and, at the same time, shaft 31 is rotated to move the object into the second vertical row and after these movements are completed the shutter is again operated to make the exposure and complete the cycle of operation. Each movement of the pedal thus moves the mask to locate the window 57 progressively opposite each square in the top row, and, at the same time moves the exposure table to correspondingly move the object with the position of the window and after each movement the shutter is operated and the photograph registered.

As soon as the top row is completed the window 58 in the mask, opposite the second row, registers with column 1 and each movement of the pedal progressively locates window 58, opposite each square of the film. When the first row is completed, the frame 32 may be slid on the rods 30 and 31 until the index finger 43 registers with the following mark on 44. This brings the top row of the exposure table into correspondence with the second row on the film and the object may be located at the beginning of this row and moved into the photographing position by each operation of the pedal. Succeeding rows on the exposure table may be handled by moving the table in accordance with the index 43—44. It should also be noted that as the table includes the entire area represented by the film, that it may be located in one position and the object moved from row to row horizontally and vertically if desired.

The illustrations show the working principles of the invention but are largely diagrammatic in form and do not necessarily show the actual apparatus that is used in carrying out the invention and which is intended to use commercial apparatus as far as this is available.

Figure 8:
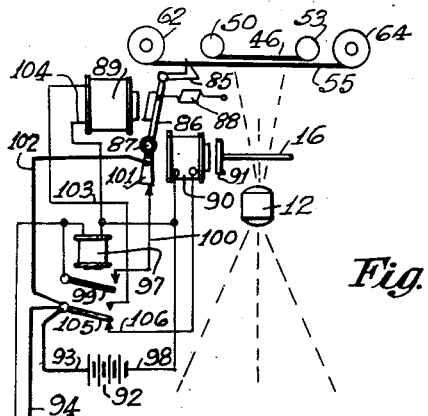
Fig. 8 is a diagram of an electrically operated system for moving the mask and for operating the camera shutter in synchronism.
Figure 7:
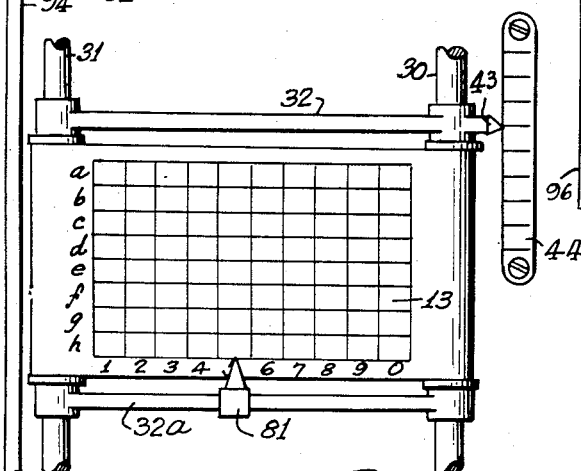
Fig. 7 is a plan view of a movable table for the object which may be positioned by manual operation.

This system adapted for electric control of the camera is illustrated in Fig. 8. The exposure table Fig. 7 may be manually positioned to locate the object with reference to the portion of the film that is exposed. To facilitate this operation an indexing member 81 is mounted on the bar 32a of the frame to indicate the vertical row that is being used and the indicator 43, with the fixed index 44, indicates the horizontal row that is being used.

The mask 55 is operated by magnet 89, through the armature 86, pivoted at 87 and having a latch 85 which engages the sprocket apertures 56 of the mask. The spring 88, when magnet 89 is deenergized, moves the latch 85 back to the engaging position and when magnet 89 is energized the latch 85 moves the mask forward for the predetermined distance. The shutter 16, which may be of the focal plane type, is controlled by the armature 91, which is operated by magnet 90, so that each time magnet 90 is deenergized an exposure is made through the lens 12.

A stick relay 97 is used to control the magnets 89 and 90. This magnet has a pick-up circuit which starts at battery 92, through conductors 93 and 94 to push button 95, conductor 96, to magnet 97 and by conductor 98 to battery 92. When the push button 95 is operated, relay 97 is energized and a holding circuit is established through contact 99 in the energized position, conductor 100, contact 101 on the end of armature 86, and conductor 102 and 93 to battery 92. This maintains relay 97 in the energized position, until the armature 86 is moved into the energized position, that is, to the position which completes the movement of the mask 55, and at this point the circuit between 100 and 101 is interrupted, thereby deenergizing the stick relay 97.

When relay 97 is energized a circuit is established from battery 92, through 93, contact 105, conductor 103 to magnet 89 and return by conductor 104 and 98 to battery. This energizes the magnet 89 and causes the movement of the mask. When this movement is completed relay 97 is deenergized and a circuit is established from the back contact 105 to conductor 106, magnet 90 and return to battery on conductor 98. The energizing of magnet 90 operates the shutter 16 to make an exposure after the movement of the mask is completed. Magnet 90 remains energized until the stick relay 97 is again energized, which deenergizes 90 and resets the shutter for another operation. The push button 95 is conveniently located to the exposure table so that the operator can re-locate the subject after each exposure.

Figure 10:
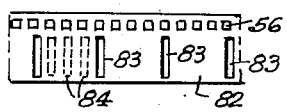
Fig. 10 is another type of mask for photographing the subject in vertical bands on the sheet.

The mask in Fig. 9 is provided with a row of sprocket apertures 56 which are engaged by the latch 85 on the armature 86 to move the mask forward for each exposure. The mask is provided with a series of windows 57, 58, spaced as indicated at 58a in horizontal rows and spaced apart a distance corresponding to the portion of the film that is exposed at one time in the camera. The mask in Fig. 10 may be operated by the apparatus shown in Fig. 8. In this case the mask is provided with vertical slots indicated at 83, leaving the space 82 to cover the film while the slot is progressively moved to a new position of the film for each exposure. In this case, the subjects on the exposure table are photographed in vertical rows. The mask in Fig. 10 also indicates at 84, in dotted outline, a use in which slots and spaces are alternately located and are of the same size, so that an exposure with this arrangement of slots would photograph each alternate vertical row on the exposure table, that is one half of the table at a time and one movement of the mask positions the apparatus for photographing the other vertical rows on the exposure table.

Figure 11:
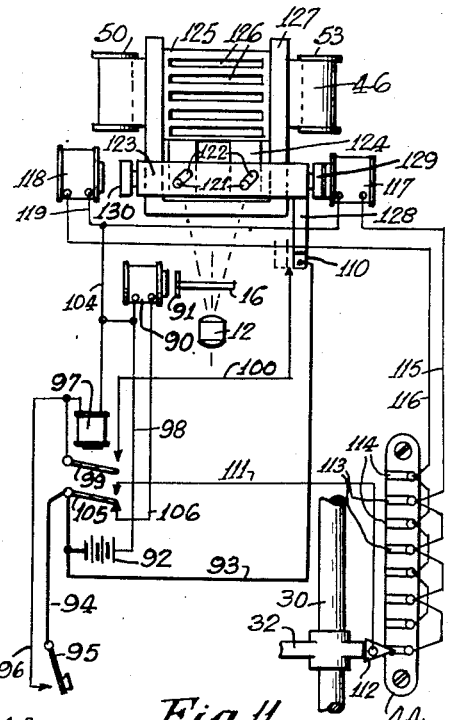
Fig. 11 is a diagram showing a form of mask for photographing one-half of the sheet at a time in horizontal spaced rows with an electric controlling apparatus for the mask and the camera shutter.

The apparatus in Fig. 11 automatically changes the mask by the movement of the exposure table. In this arrangement the film 46 on reels 50, 53, moves behind the mask 125 which is provided with horizontal slots 126 and moves vertically in the frame 127 to the extent of one of the slots. A motion plate 123 provided with inclined slots 122 engage pins 121, located in the legs 124 of the mask 125, so that as the motion plate is moved to the right the mask 125 is lowered and as it is moved to the left this mask is raised, the extent of the movement by the motion plate being arranged to change the slots from the exposed to the unexposed portion of the film. A magnet 118, by armature 130, moves the motion plate to the left and magnet 117, by armature 129, moves the motion plate to the right, magnets 117 and 118 are selectively operated by the movement of the exposure table.

The stick relay 97, operated by the push button 95, has a holding circuit on conductor 100 which engages the insulated contact 110 attached to the motion plate 123 and so arranged that contact 110 establishes a circuit with conductor 100 on the first movement of the motion plate and maintains this circuit until the final motion when it is interrupted, as indicated by the dotted outline. This arrangement operates by the movement of the motion plate in both directions and maintains the stick relay energized until the motion plate completes its movement. The circuit from 110 returns to battery on conductor 93.

Magnet 117 is controlled by conductor 115, connecting to the contacts 113 on the fixed index plate 44, contacts 114 being alternately spaced with contacts 113 which connect by conductor 116 with magnet 118. The return circuit of magnets 117 and 118 is completed through conductor 104 and conductor 98 to battery 92. When the stick relay 97 is energized a circuit is closed from battery 92, through contact 105, conductor 111, insulated contact 112 on the frame 32, which connects with the contacts 113 and 114 as the frame is moved to register with these contacts.

When push button 96 is operated it is momentarily held closed to maintain stick relay 97 energized until the circuit is established between 100 and 110. At the same time, a circuit is established through contact 112 to one of the contact members on 44. If the contact is established with 113, magnet 117 will be energized and the motion plate will be moved to lower the mask 125. When the frame 32 is moved to the next contact 114, magnet 118 is energized to move the motion plate to the left and thereby raise the mask 125 to its new position. The next movement of frame 32 engages another contact 113 and energizes magnet 117 to move the motion plate to the right and lower the mask 125. In this application the subject is photographed in horizontal rows, one-half of the exposure table being photographed each operation.

Having thus described my invention, I claim:

1. A system for making multi-photographs on sensitized sheets comprising a camera with an optical system for exposing the entire sheet, a mask covering said sheet and having a window therein for exposing only the position of the sheet opposite the window, electrically operated means for moving the mask to change the position of the window after each exposure, a movable support for the object to be photographed for locating the object to correspond with the location of the window, said movable support controlling the circuit of said electrically operated means.

2. A system for making multi-photographs on a sensitized sheet comprising a camera with an optical system for exposing the entire sheet, a mask selecting a portion of said sheet for exposure, means for moving said mask relative to the sheet to change the exposed portion of the sheet, a movable support for the objects to be photographed means for changing the position of said support to correspond with the exposed portion of the sheet, and a lever for operating said camera and movable support.

3. A system for making multi-photographs on a sensitized sheet comprising a camera with an optical system for exposing the entire sheet, a mask covering said sheet and means for moving said mask relative to said sheet, said mask having a window to make a first row of exposures on said sheet as the mask is moved, and a second window to make a second row of exposures, spaced from the first row, by the continued movement of said mask and a movable table for the object to be photographed positioned to locate the objects in successive positions to correspond with the location of the window of the mask as the mask moves to each photographing position.

4. A system for making multi-photographs on a sensitized sheet comprising a camera with an optical system for exposing the entire sheet, a mask covering said sheet and having a window exposing a portion of the sheet, means for moving said mask relative to said sheet progressively, a moving support for the object to be photographed and cooperative means for moving the object with the mask to correspond with the location of the window in the mask.

5. A system for making multi-photographs on a sensitized sheet comprising a camera with an optical system for exposing the entire sheet, a mask covering said sheet and having a window exposing a portion of the sheet, means for moving said mask relative to said sheet progressively, a moving support for the object to be photographed, and a lever for operating said mask and said support cooperatively so that the object corresponds with the position of the exposed portion of the sheet.

6. A system for making multi-photographs on a sensitized sheet comprising a camera with an optical system for exposing the entire sheet, a mask covering said sheet and having a square window exposing a square portion of the sheet, means for moving said mask progressively relative to said sheet to make a row of exposures in squares, a table laid out in squares corresponding to the exposed squares of the sheet, and an object to be photographed located on said squares on the table to be photographed progressively as the mask is moved.

7. A system for making multi-photographs on a sheet, comprising a camera with an optical system for exposing the sheet, a mask covering said sheet with a window therein for exposing only a portion of said sheet, a magnet for moving said mask to make a new exposure; a push button controlling said magnet, a movable support for the object to be photographed and means controlling said magnet by said movable support only after the push button is operated.

8. A system for making multi-photographs on a sheet, comprising a camera with an optical system for exposing the sheet, a mask covering said sheet with a window therein for exposing only a portion of said sheet, a magnet for moving said mask to make a new exposure, a movable support for the object to be photographed having means controlling said magnet, a stick relay controlling said magnet and a circuit controller controlling said stick relay, said stick relay maintaining the circuit of said magnet until the movement of the mask is completed.

9. A system for making multi-photographs on a sheet, comprising a camera with an optical system for exposing the sheet, a mask covering said sheet with a window therein for exposing only a portion of said sheet, a magnet for moving said mask to make a new exposure, a movable support for the object to be photographed having means controlling said magnet, a stick relay controlling said magnet and the shutter of the camera and a circuit controller controlling said stick relay, said stick relay maintaining the circuit of said magnet until the movement of the mask is completed and then operating the shutter.

10. A system for making multi-photographs on a sheet, comprising a camera with an optical system for exposing the sheet, a mask for said sheet comprising a series of spaced slots, the distance between a pair of adjacent slots being substantially equal to the width of a slot, a motion plate for moving said mask relative to said sheet a distance equal to the width of a slot a movable support for the object to be photographed having means for moving said motion plate in opposite directions to change the exposure through said mask.

11. A system for making multi-photographs on a sheet, comprising a camera with an optical system for exposing the sheet, a mask for said sheet comprising a series of spaced slots, the distance between a pair of adjacent slots being substantially equal to the width of a slot, a motion plate for moving said mask relative to said sheet a distance equal to the width of a slot, a pair of magnets for moving said motion plate in opposite directions a movable table for the object to be photographed, and means controlled by the position of the table for selectively energizing each of said magnets to move said motion plate in opposite directions to change the exposure through said mask.

12. A system for making multi-photographs on a sheet, comprising a camera with an optical system for exposing the sheet, a mask for said sheet comprising a series of spaced slots, the distance between a pair of adjacent slots being substantially equal to the width of a slot, a motion plate for moving said mask relative to said sheet a distance equal to the width of a slot, a pair of magnets for moving said motion plate in opposite directions, a stick relay controlling said magnets to complete the stroke of the motion plate, a circuit controller controlling said stick relay, a table for the object to be photographed and means controlled by the movement of said table for alternately energizing said magnets to move the motion plate in opposite directions.

13. A system for making multi-photographs on a sheet, comprising a camera with an optical system for exposing the sheet, a mask for said sheet, having a slot extending across the sheet, means for moving said mask progressively by a stepping motion across the sheet to progressively expose the sheet in bands, each step corresponding with the width of said slot and a movable table for the objects to be photographed positioned to locate the objects to correspond with the exposed slots in the mask.

ROBERT STUART.